Oct. 24, 1950  W. D. EDWARDS  2,526,736
RECIPROCATING AND OSCILLATING CULTIVATOR
Filed Jan. 22, 1948  5 Sheets-Sheet 1

INVENTOR.
WILLIAM D. EDWARDS
BY
Weatherford and
Weatherford
Attys.

Oct. 24, 1950 W. D. EDWARDS 2,526,736
RECIPROCATING AND OSCILLATING CULTIVATOR
Filed Jan. 22, 1948 5 Sheets-Sheet 3

INVENTOR
WILLIAM D. EDWARDS

Oct. 24, 1950 W. D. EDWARDS 2,526,736
RECIPROCATING AND OSCILLATING CULTIVATOR
Filed Jan. 22, 1948 5 Sheets-Sheet 4

INVENTOR
WILLIAM D. EDWARDS
BY Weatherford and
Weatherford
Attys.

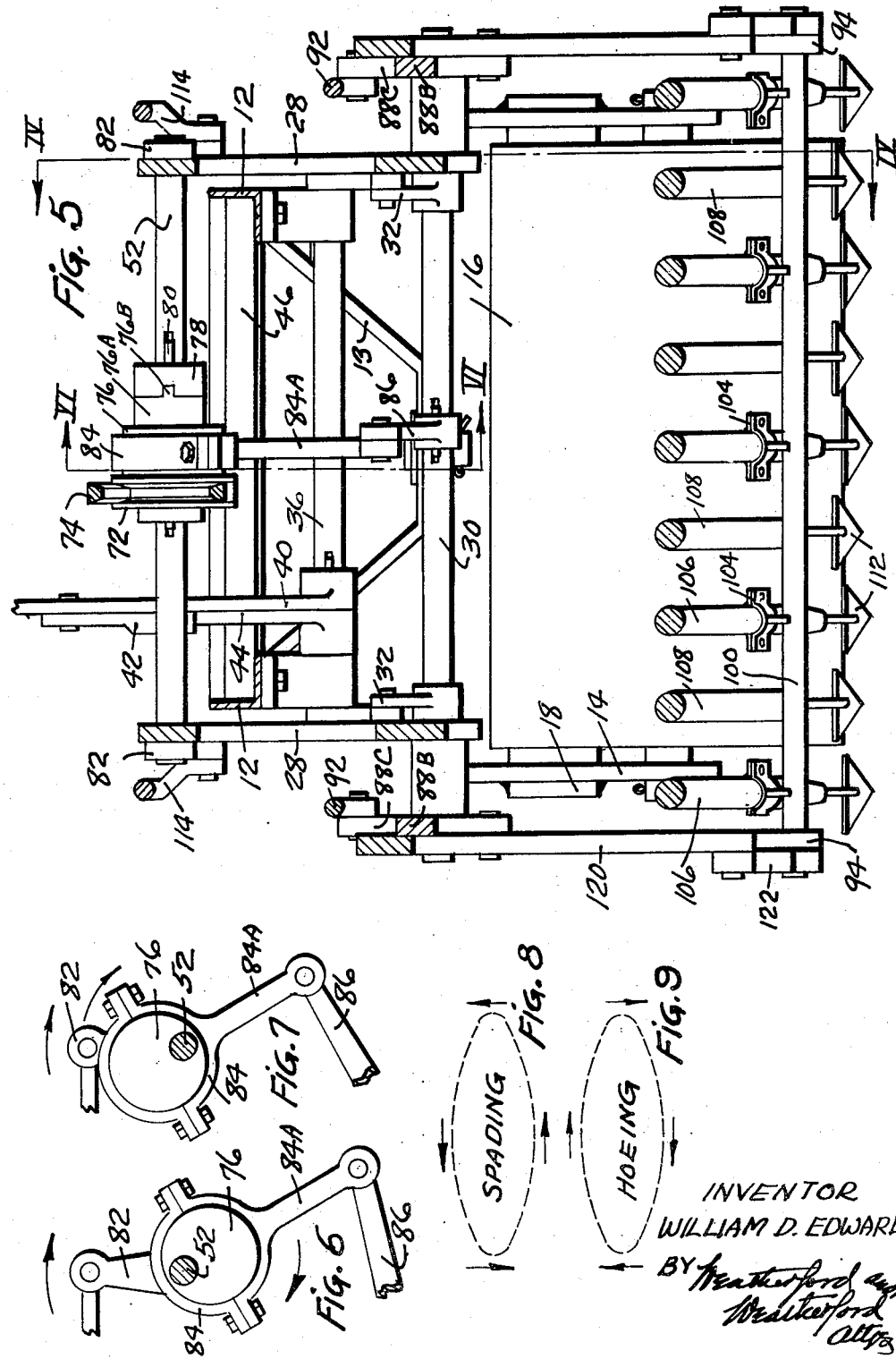

Patented Oct. 24, 1950

2,526,736

UNITED STATES PATENT OFFICE 2,526,736

RECIPROCATING AND OSCILLATING CULTIVATOR

William D. Edwards, Whitehaven, Tenn.

Application January 22, 1948, Serial No. 3,770

9 Claims. (Cl. 97—36)

This invention relates to improvements in cultivating implements which may be employed in hoeing, chopping and spading.

It has especial reference to wheel supported machines which may be interchangeably equipped with hoes or spades in plural number, and are adapted to be drawn or otherwise propelled along the ground to effect multiple hoeing or spading operations.

It further relates to cultivating implements which may be set to provide raised forward, and depressed rearward, strokes simulating the hoeing stroke used in hand chopping, or may be set to provide depressed forward, and raised rearward, strokes simulating hand spading and in either case, may be adjusted as to depth of cut either before or during the operation.

It further relates to implements in which roots, grass, vines or other weeds dug up, particularly in spading, are conveyed rearwardly and in such conveying substantially freed from adhering dirt and delivered rearwardly of the machines, and if desired, deposited into trailing receptacles, not here shown.

It further relates to cultivating implements in which the hoeing or spading instrumentalities employed may be raised for movement of the machine from place to place.

The objects of the invention are primarily:

To provide a simple, rugged and efficient cultivating implement for hoeing and spading;

To provide a cultivating implement which may be readily changed from a hoeing to a spading mechanism and operated as either thereof;

To provide a cultivating implement accomplishing multiple hoeing or spading as the case may be;

To provide, in a cultivating implement, means for removing and sifting during removal, roots, weeds and the like dug up and the dislodgement of dirt therefrom;

To provide in a cultivating implement means for setting and readily adjusting the depth of cut during, and without interfering with, operation; and To provide a cultivating implement which may be readily transported from place to place.

These objects are accomplished by an implement mounted upon wheels, which when hauled, or otherwise propelled, over the ground will act as a multiple hoe, cutting out grass, weeds and other objectionable growth, under shallow cultivation, in the manner of the human "hoe hand," but with an increase of efficiency; one of the major fields of use being in the type of planting of the row-crops such as corn, cotton, potatoes, etc., there used to clear out the "middles" or space between the planted rows.

The dual nature of this implement permits its ready conversion from the multiple hoe to the multiple spade or shovel type, and as such can be used for the same purposes as outlined above, but securing a deeper cultivation than the shallow one of the hoe type.

Moving along rows or over fields infected with undesirable growth, such as weeds, vines, and various forms of grass, this implement as a multiple spade, will dig up this growth together with the roots of the same, free them from loose dirt, and convey these roots to the rear of the machine and deposit them.

Equipped as a multiple spade, this implement can be used to remove the sod of grasses for the purposes of transplanting to other fields; this implement cutting the sod loose, lifting and conveying it to the rear of the implement and depositing it, if desired, in a trailing receptacle.

The above examples are citations of the possible uses of this implement, however, I do not wish to be restriocted to them, as others may present themselves.

The means by which the foregoing and other objects are accomplished, and the manner of their accomplishment will readily be understood from the following specification on reference to the accompanying drawings, in which:

Fig. 5 is an enlarged cross sectional elevation taken on the line V—V of Fig. 1.

Figs. 6 and 7 are fragmentary views taken on the line VI—VI of Fig. 5 showing adjusted relations of the depth effecting eccentric and the thrust actuating arms, and their relative positions for spading and hoeing respectively.

Figs. 8 and 9 show the corresponding elliptical paths of travel of the spades and hoes.

Figure 1:
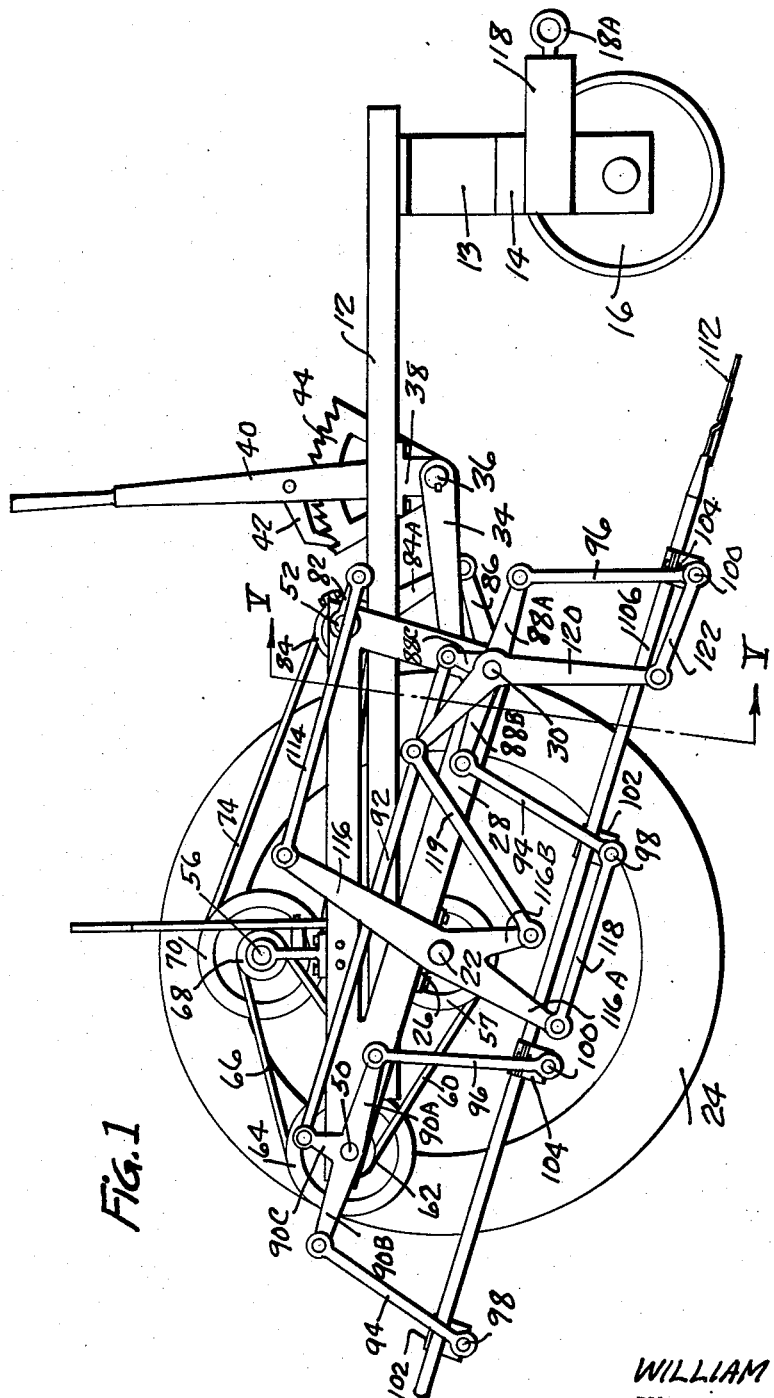
Fig. 1 is a side elevational view, with the foreground wheel removed, of the implement equipped for spading.

Referring now to the drawings in which the various parts are indicated by numerals:

The implement comprises a main frame including side rails 12, which frame is supported at its forward end by a downwardly extending bracket 13 and a steerable yoke 14 journalling a roller 16, or other type of wheels, and equipped with traction coupling elements 18, 18A. At its rear end the frame is supported by bearings 20 journalling a transverse axle 22 to which at its opposite ends supporting and driving wheels 24 are secured.

Oscillatably mounted on the axle 22, as through bearings 26, is a rocker frame including a pair of triangular sides 28, the bearings preferably being positioned below and intermediate the length of the frame sides. The upper legs 28A of the sides are connected and braced intermediate their length by a cross member 28B.

Figure 2:
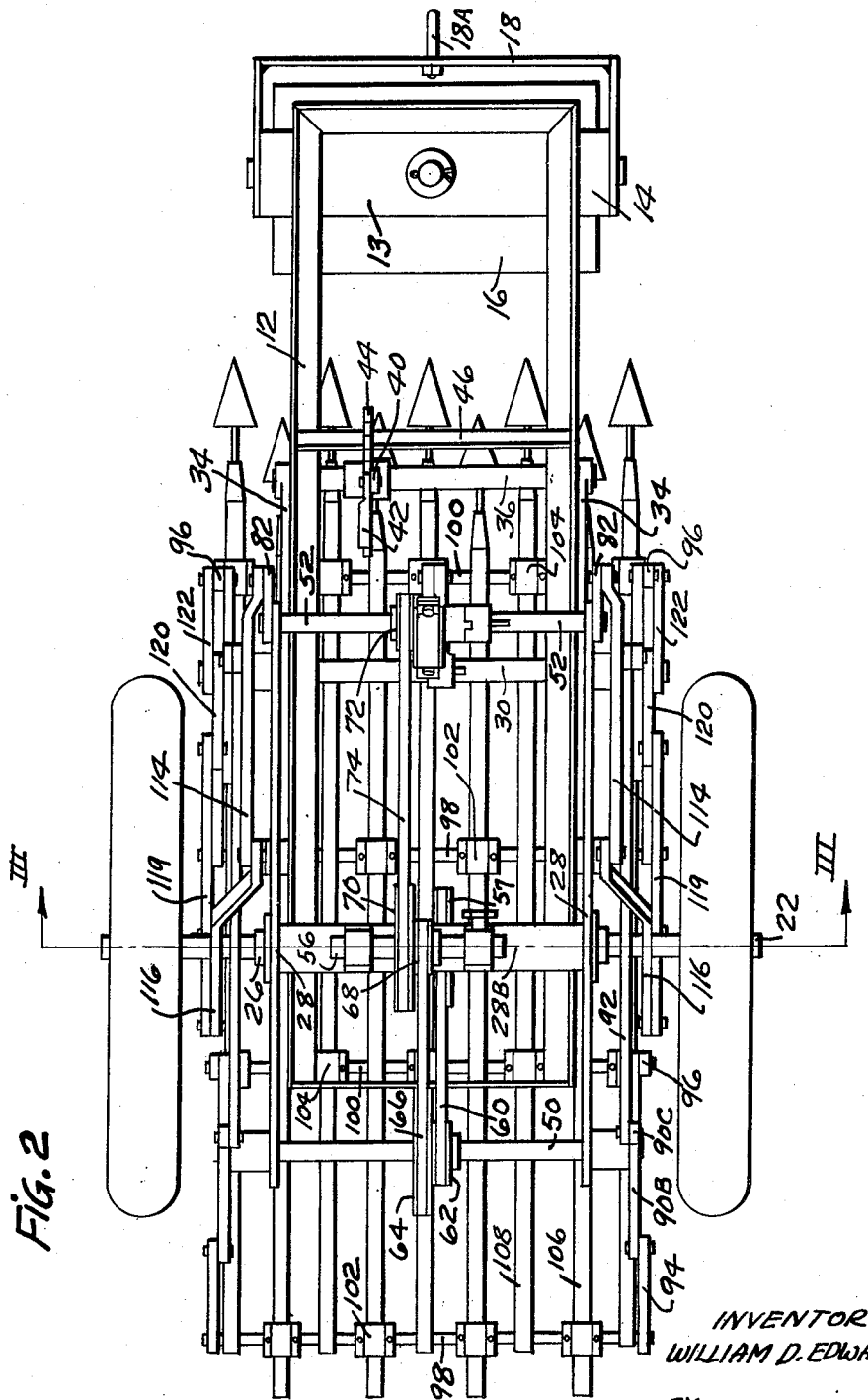
Fig. 2 is a corresponding plan view.
Figure 3:
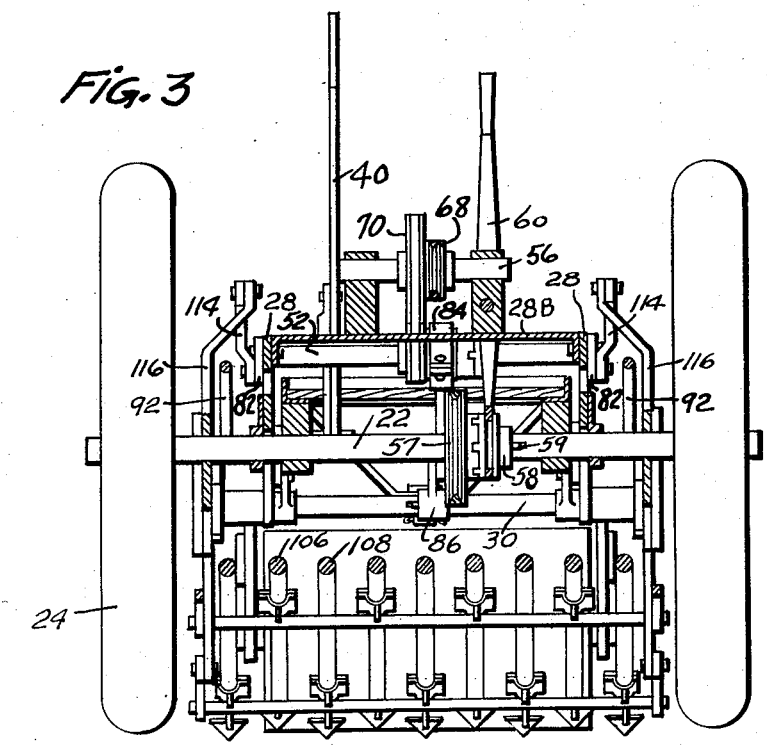
Fig. 3 is a transverse sectional view taken on the line III—III of Fig. 2.
Figures 4, 4A:
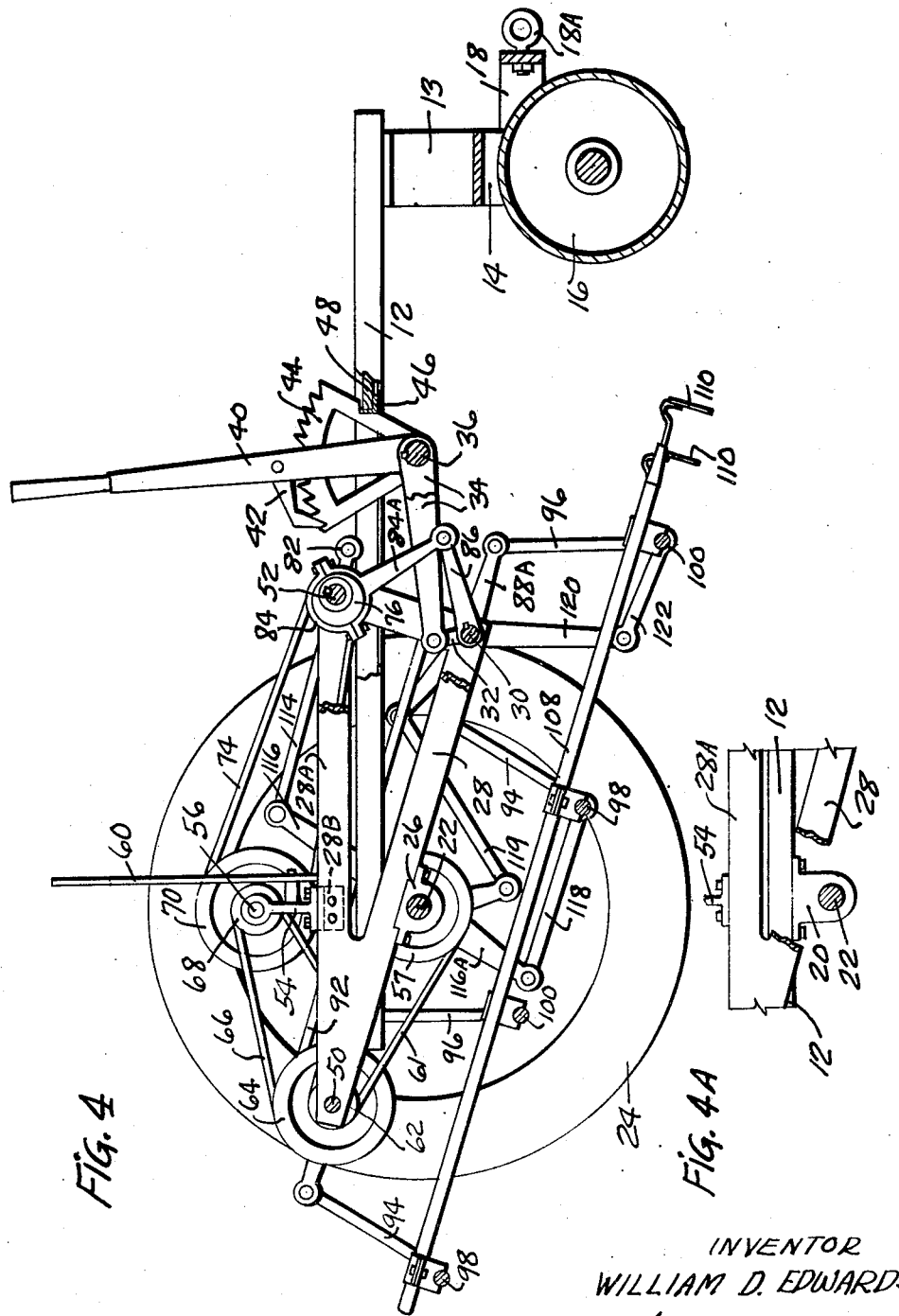
Fig. 4A is a fragmentary sectional view, related to Fig. 3, with a portion of the rocker frame broken away to show the main frame support bearing.
Fig. 4 is a sectional elevational view of the implement taken on the line IV—IV of Fig. 5, with a portion of the rocker frame, and a portion of the main frame broken away, the implement being equipped for hoeing.

At the lower forward end of the frame the sides journal an oscillatable shaft 30. This shaft is coupled through links 32 to arms 34 which in turn are keyed, or otherwise secured, to an oscillatable shaft 36. Also keyed to the shaft 36 is an arm 40 carrying a pawl 42 which engages a ratchet arc 44 carried on the shaft 36 and secured against turning as by a cross angle 46 carried by the rails 12. The arm 40 and linkage provide means for raising and lowering the rocker frame to adjust depth of cut and for raising the rocker frame during transportation from place to place. Forwardly of the arc a floor 48 extends between the rails. This floor being omitted from the plan view of Fig. 2.

The sides 28 of the rocker frame journal at their respective rear and forward ends shafts 50, and the cross member 28B between the sides carries brackets 54 which journal a third shaft 56. Mounted on the axle 22 is a driving pulley 57 which may be drivingly coupled to or disconnected from the axle by a clutch 58. The clutch is driven through a spline 59 and shifted by a clutch lever 60. Through a belt 61 and pulley 62 the pulley 57 drives the shaft 50. The shaft 50 through a pulley 64, belt 66 and pulley 68 drives the shaft 56, and this shaft in turn through pulleys 70 and 72 (Fig. 5) and a belt 74 drives the shaft 52. The belts 60, 66 and 74 may be chain belts, and the pulleys may be sprockets, though smooth belts and pulleys are shown.

Mounted on the shaft 52 and constrained as by the pulley 72 from longitudinal shift is an eccentric 76 having a hub portion 76A carrying a diametral lug 76B. Shiftably mounted on the shaft 52 is a collar 78 constrained to rotate with the shaft by a spline 80, the collar being diametrally recessed for engagement with the lug 76B to effect driving engagement with the eccentric. The shaft 52 also carries two crank arms 82 which are secured to the shaft and extend in identical direction away therefrom at an angle of from thirty to forty degrees with the major axis of the eccentric. By release of such engagement the eccentric may be rotated through one hundred eighty degrees and be reengaged in such shifted position, causing, in the one case, the major throw of the eccentric to lead the crank arm some one hundred forty-five degrees and in the other to lag therebehind a complementary amount.

Around the eccentric 76 is a strap 84 which through a rod 84A is pin connected to an arm 86 keyed or otherwise secured to the shaft 30. Secured on the shaft 30 adjacent its opposite ends are a pair of horizontal rocker arms, each comprising oppositely extending arm portions 88A, 88B and a T arm portion 88C. A second pair of similar arms is mounted on the shaft 50, these arms also having oppositely extending arm portions 90A, 90B and T arm portions 90C. The T portions 88C, 90C of the two sets of arms are connected by rigid links 92, so that all thereof are constrained to move in unison. Opposite ends of the rocker arms are connected through depending hangers 94, 96 to cross bars 98, 100, respectively. The bars 98, 100 respectively carry upwardly extending clamps 102, 104 which are spaced along the bars 98 and 100 to engage alternate ones of handles 106, 108 which carry hoes 110 or spades 112 as the need arises.

The crank arms 82 are pin connected through rigid links 114 to upper ends of vertically disposed rocker levers 116 pivotally mounted on the axle 22 on opposite sides of the machine. These levers have extending portions 116A which are connected at their lower ends by rigid links 118 to opposite ends of the cross bars 98 and operative coupling thus effected to one set of the handles 108. The levers 116 have additional extending portions 116B which are connected through rigid links 119 to the upper ends of rocker levers 120 oscillatably mounted on opposite end portions of the shaft 30, the levers extending beyond and below the shaft and being coupled by rigid links 122 to the opposite ends of the cross bar 100, and operative coupling thus effected to the sets of handles 106 in manner to retract them as the handles 108 are advanced and vice versa.

In operation the machine is pulled or otherwise forwardly traversed. As the wheels turn, the axle 22 through the pulley 57, the belt 60 and the additional pulleys and belts turns the operating shaft 52 at a relatively rapid rate of speed, the rotation of the shaft 52 turning the eccentric 76 and the arms 82.

The eccentric 76 through the strap 84 and rod 84A oscillates the arm 86 and the shaft 30 to which that arm is secured. The oscillation of the shaft 30 rocks the extending portions 88A, 88B and 88C of the rocker arms. The T portion 88C of these arms through the links 92, and the corresponding T portions 90C of the second set of arms rock the arm portions 90A and 90B of the latter arms. This rocking of the arms, through the hangers 96, raises and lowers the transverse bars 100 and the set of blade handles 106 and the hoes or spades carried thereby, and concurrently through the links 94 lowers and raises the bars 98 and through these bars lower and raise the set of handles 108 carried thereby so that alternate ones of the handles are raised at the same time that the handles therebetween are lowered and vice versa.

As the raising and lowering of the handles is effected, as above described, the rotation of the arms 82, through the links 114, oscillates the levers 116. This oscillation, through the portions 116A of the levers and the links 118, imparts a substantially horizontal thrust to the cross-bars 98 and the handles 108 carried thereby, moving them forward and retracting them irrespective of the level at which these handles are positioned by the concurrent action of the eccentric. At the same time, through the portions 116B of the levers, the links 118, the arms 120, and the links 122, the cross-bars 100 and the handles carried thereby are retracted and thrust forward, thus alternately causing one set of the chopping blades or spading blades, as the case may be, to move forward as the other set is moving backward and vice versa.

Where hoeing is to be accomplished it is necessary that the hoes 110 be raised during their forward movement and depressed into hoeing or chopping contact with the ground during their rearward movement, whereas in spading the reverse action is necessary; that is, the spades are thrust forward and downward into the ground and are raised and brought backward above the ground. In accomplishing these movements the path of blade movement is substantially an ellipse with its major axis substantially horizontal and the line of thrust of the blades at an angle thereto. The depressing action of the eccentric for spading must occur in advance of the forward thrust and the depressing action in hoeing must occur after the forward thrust. This is effected by the relative angular positioning of the arms 82 and the eccentric 76 on the shaft 52.

With the eccentric coupled by the collar 78 for hoeing the collar may be retracted and the eccentric turned one hundred eighty degrees and the collar reengaged to change the relative advance of the raising and depressing strokes and the thrusting and retracting strokes and thereby change from the hoeing stroke to the spading stroke.

Prior to operation the lever 40, shown in position effecting greatest depression of the blades, may be shifted forward to swing the arms 34 upward and raise the forward ends of the sides 28 of the rocker frame about the axle 22 as a fulcrum without affecting the relative relations of the operating parts carried thereby or the driving actions thereon. In operation the lever 40 is shifted rearward to establish the desired depth of cut which may thereafter be deepened or lightened as conditions indicate. On completion of operation, or at any other desired time, the lever 40 may be swung fully forward and the rocker frame raised to raise the blades well above the ground for movement of the machine as from field to field, or its transportation to another location.

In spading the blades cut into and raise the earth and with it grass and weeds. These materials move backward and upward along the handles, the earth largely dropping therebetween, grass and weeds, however, and earth adhering thereto, particularly where the roots are matted, traveling backward along the handles which raise and lower it and shake the earth loose, matted portions at least of the roots being discharged at the rear of the machine and collected as may be desired.

It will be understood that the hoes and/or spades may be of any desired shape or conformation, and that other instrumentalities may be used, and that the various details of construction may be varied, and that I do not wish to be limited to such detail except in a claim where they are specifically set out.

It will be further understood that while the handles are oscillatably supported at both ends, one of such ends only, preferably the blade ends, need be raised and lowered during operation.

I claim:

1. A cultivating implement which includes an axle and supporting wheels secured on and driving said axle, a frame pivotally supported intermediate its length by said axle, means forming part of said implement for raising and lowering the forward end of said frame, and instrumentalities carried by and movable with said frame; said instrumentalities including a shaft journalled adjacent the forward end of said frame, and means driving said shaft from said axle, crank arms secured on said shaft and extending in parallel relation therefrom, an eccentric and yoke mounted on said shaft and clutch means carried by said shaft for securing said eccentric in either of two diametrally opposed positions on said shaft, generally horizontally disposed rocker arms pivotally mounted in related pairs respectively adjacent the forward and rear ends of said frame, means coupling said rocker arms for concurrent movement, means operatively coupling said eccentric yoke to said rocker arms; hangers in sets depending respectively from the front and rear ends of said rocker arms, a first pair of members carried by one set of said hangers and a second pair of members carried by the other set of said hangers, and cultivating means in sets carried respectively by said first and second pairs of members; vertically disposed pairs of levers pivotally carried by said frame, means operatively connecting the lower portions of one said pair of said levers with upper portions of the other said pair, means respectively connecting the lower ends of one pair of said levers to one member of said first pair of members, and the lower ends of the other said pair of levers to one member of the second said pair of members, and means operatively connecting said crank arms to one pair of said vertically disposed pair of levers.

2. A cultivating implement which includes an axle and supporting wheels secured on and driving said axle, a frame pivotally supported intermediate its length by said axle, means forming part of said implement for raising and lowering the forward end of said frame, and instrumentalities carried by and movable with said frame; said instrumentalities including a shaft journalled adjacent the forward end of said frame, and means driving said shaft from said axle, crank arms secured on said shaft and extending in parallel relation therefrom, an eccentric and yoke mounted on said shaft and clutch means carried by said shaft for securing said eccentric in either of two diametrally opposed positions on said shaft, substantially horizontally disposed rocker arms pivotally mounted in pairs respectively adjacent the forward and rear ends of said frame; links coupling said rocker arms for concurrent movement, means operatively coupling said eccentric yoke to said rocker arms; hangers in sets depending respectively from the front and rear ends of said rocker arms, a first pair of members carried by one set of said hangers, a second pair of members carried by the other set of said hangers, and cultivating means in sets carried respectively by said first and second pairs of members; a first pair of vertically disposed rocker levers pivotally mounted on said axle, a second pair of vertically disposed rocker levers pivotally carried by said frame, links operatively connecting the lower portions of said first pair of vertically disposed levers to the upper portions of said second pair of said levers, links connecting the lower ends of the first said pair of said vertically disposed levers to one member of one said pair of members, links coupling the lower ends of the second said pair of said levers to the other said pair of members, and links operatively connecting said crank arms to the upper ends of one pair of said levers.

3. A cultivating implement which includes an axle and supporting wheels secured on and driving said axle, a main frame journalled adjacent its rear end on said axle and wheel means supporting the forward end of said frame, a rocker frame pivotally supported intermediate its length by said axle, means carried by said main frame for raising and lowering the forward end of said rocker frame, and instrumentalities carried by and movable with said rocker frame; said instrumentalities including a shaft journalled adjacent the forward end of said rocker frame, and means driving said shaft from said axle; crank arms secured on said shaft and extending in parallel relation therefrom, an eccentric and yoke mounted on said shaft and clutch means carried by said shaft for securing said eccentric in either of two diametrally opposed positions on said shaft; substantially horizontally disposed rocker arms pivotally mounted in pairs respectively adjacent the forward and rear ends of said rocker frame, means coupling said rocker arms for concurrent movement, means operatively coupling said eccentric yoke to said rocker arms, hangers in sets depending respectively from the front and rear ends of said rocker arms, a first pair of members carried by one set of said hangers, a second pair of members carried by the other set of said hangers, and cultivating means in sets carried respectively by said first and second pairs of members; a first pair of vertically disposed rocker levers pivotally mounted on said axle, a second pair of vertically disposed rocker levers pivotally carried by said frame, means operatingly connecting lower portions of one said pair of vertically disposed levers to upper portions of the other said pair of levers, means respectively connecting the lower ends of one said pair of vertically disposed levers to one member of one said pair of members, and of the other of said pair of levers to one member of the other said pair of members, and means operatively connecting said crank arms to one pair of said rocker levers.

4. A cultivating implement which includes an axle and supporting wheels secured on and driving said axle, a frame pivotally supported intermediate its length by said axle, means forming part of said implement for raising and lowering the forward end of said frame, and instrumentalities carried by and movable with said frame; said instrumentalities including a shaft journalled by the forward end of said frame, and means driving said shaft from said axle; crank arms secured on said shaft and extending in parallel relation therefrom, and an eccentric and yoke mounted on and driven by said shaft; substantially horizontally disposed rocker arms pivotally mounted in pairs respectively adjacent the forward and rear ends of said frame, means coupling said rocker arms for concurrent movement, means operatively coupling said eccentric yoke to said rocker arms, hangers depending from the opposite ends of said rocker arms, a first pair of members carried by one set of said hangers, a second pair of members carried by the other of said sets, and cultivating means in sets carried respectively by said first and second pairs of members; vertically disposed levers in pairs pivotally mounted in spaced relation along said frame, means operably connecting one said pair of levers above their pivotal mountings with the other said pair of levers below their said mountings, means operatively connecting the lower ends of one said pair of said levers to one said pair of members, and of the other said levers to the other said pair of members, and means operatively connecting said crank arms to one pair of said levers.

5. A cultivating implement which includes an axle and supporting wheels secured on and driving said axle, a platform journalled adjacent its rear end on said axle, and wheel means supporting the forward end of said platform, a frame pivotally supported intermediate its length by said axle and means carried by said platform for raising and lowering the forward end of said frame, and instrumentalities carried by and movable with said frame; said instrumentalities including a shaft journalled by the forward end of said frame, and means driving said shaft from said axle; crank arms secured on said shaft and extending in parallel relation therefrom, and an eccentric and yoke mounted on and driven by said shaft; substantially horizontally disposed rocker arms pivotally mounted in pairs respectively adjacent the forward and rear ends of said frame, means coupling said rocker arms for concurrent movement, means operatively coupling said eccentric yoke to said rocker arms, hangers depending from the opposite ends of said rocker arms, a first pair of members carried by one set of said hangers, a second pair of members carried by the other of said sets, and cultivating means in sets carried respectively by said first and second pairs of members; vertically disposed levers pivotally mounted in pairs on and spaced apart along said frame, means operably connecting one pair of said levers above their said mounting, with the other said pair below their said mountings, links connecting the lower ends of one pair of said levers to one said pair of members, links connecting the lower ends of one said pair of levers to the other said pair of members, and means operatively connecting said crank arms to the upper ends of said rocker levers.

6. A cultivating implement which includes an axle and supporting wheels secured on and driving said axle, a frame pivotally supported intermediate its length by said axle, means forming part of said implement for raising and lowering the forward end of said frame; and instrumentalities carried by and movable with said frame; said instrumentalities including a shaft journalled adjacent the forward end of said frame, means driving said shaft from said axle, crank arms secured on said shaft and extending in parallel relation therefrom, an eccentric and yoke mounted on said shaft and clutch means carried by said shaft for securing said eccentric in either of two diametrally opposed positions on said shaft; related sets of cultivating means disposed below said frame, substantially horizontally disposed rocker means and vertically disposed levers in pairs pivotally carried by said frame, hanger means depending from opposite ends of said horizontal rocker means oscillatably supporting said sets, means operatively coupling said eccentric yoke to said horizontal rocker means, means operatively connecting said crank arms to one pair of said vertical levers, means interconnecting one pair of said levers above their pivotal connections to the other pair thereof below their pivotal connections, and means operably connecting the lower ends of said pairs of levers respectively to said sets of cultivating means.

7. A cultivating implement which includes an axle and supporting wheels secured on and driving said axle, a frame pivotally supported intermediate its length by said axle, means forming part of said implement for raising and lowering the forward end of said frame, and instrumentalities carried by and movable with said frame; said instrumentalities including a shaft journalled adjacent the forward end of said frame, means driving said shaft from said axle, crank arms secured on said shaft and extending in parallel relation therefrom, and an eccentric and yoke mounted on said shaft; related sets of cultivating means disposed below said frame, substantially horizontally disposed rocker means oscillatably carried by said frame, and vertically disposed levers in pairs journalled by and spaced apart along said frame, hanger means depending from opposite ends of said horizontal rocker means coupled to and oscillatably supporting said sets, means operatively coupling said eccentric yoke to said horizontal rocker means, means operatively connecting said crank arms to one pair of said vertical levers, means operably connecting one pair of said levers above said frame to the other pair thereof below said frame, and means operably connecting the lower end of one pair of said vertical levers to one of said sets, and the lower ends of the other said pair to the other said set.

8. A cultivating implement which includes an axle and supporting wheels secured on and driving said axle, a platform journalled adjacent its rear end on said axle, and wheel means supporting the forward end of said platform, a frame pivotally supported intermediate its length by said axle, means carried by said platform for raising and lowering the forward end of said frame, and instrumentalities carried by and movable with said frame; said instrumentalities including a shaft journalled adjacent the forward end of said frame, means driving said shaft from said axle, crank arms secured on said shaft and extending in parallel relation therefrom, an eccentric and yoke mounted on said shaft and clutch means carried by said shaft for securing said eccentric in either of two diametrally opposed positions on said shaft; related sets of cultivating means disposed below said frame, substantially horizontally disposed rocker means in pairs, and vertically disposed rocker levers in pairs pivotally carried by said frame in spaced relation, hanger means depending from the forward ends of said horizontal rocker means pivotally coupled to and supporting one of said sets, and like hanger means depending from the rear ends of said rocker means supporting the other of said sets, means operatively coupling said eccentric yoke to said horizontal rocker means, means operatively connecting said crank arms to one pair of said levers, and links pivotally connected to said lever pair below their said pivots and to the other said lever pair above their said pivots.

9. A cultivating implement which includes an axle and supporting wheels secured on and driving said axle, a frame pivotally supported intermediate its length by said axle and means forming part of said implement for raising and lowering the forward end of said frame, and instrumentalities carried by and movable with said frame, said instrumentalities including a shaft journalled by the forward end of said frame, and means driving said shaft from said axle; crank arms secured on said shaft and extending in parallel relation therefrom, and an eccentric and yoke mounted on and driven by said shaft; a pair of substantially horizontally disposed rocker arms pivotally mounted adjacent the forward end of said frame, means operatively coupling said eccentric yoke to said rocker arms, hangers depending respectively from the front and rear ends of said rocker arms, a pair of members carried by one set of said hangers, a second pair of members carried by the other of said sets, and cultivating means in sets carried respectively by said first and second pairs of members; vertically disposed levers in spaced pairs pivotally mounted on said frame, means operably connecting the lower ends of one pair of said levers to one said pair of members and the lower ends of the other said levers to the other said pair of members, and means operatively connecting said crank arms to one pair of said levers.

WILLIAM D. EDWARDS.

REFERENCES CITED

The following references are of record in the file of this patent:

UNITED STATES PATENTS

| Number | Name | Date |
| --- | --- | --- |
| 1,413,910 | Marrero | Apr. 25, 1922 |
| 1,732,496 | Brundige | Oct. 22, 1929 |
| 1,827,074 | Ditlevsen | Oct. 13, 1931 |

FOREIGN PATENTS

| Number | Country | Date |
| --- | --- | --- |
| 79,522 | Austria | Dec. 29, 1919 |
| 366,296 | Germany | Jan. 3, 1923 |
| 28,101 | Australia | Aug. 6, 1931 |